United States Patent
Nakamura et al.

(10) Patent No.: US 9,244,893 B2
(45) Date of Patent: *Jan. 26, 2016

(54) METHOD, COMPUTER, AND SYSTEM FOR AN OPERATING SYSTEM INDEPENDENT DEVICE DRIVER

(71) Applicant: Seiko Epson Corporation, Tokyo (JP)

(72) Inventors: Hideo Nakamura, Nagano-ken (JP); Takayoshi Namikoshi, Nagano-ken (JP); Hirotada Yokosawa, Nagano-ken (JP)

(73) Assignee: Seiko Epson Corporation, Tokyo (JP)

(*) Notice: Subject to any disclaimer, the term of this patent is extended or adjusted under 35 U.S.C. 154(b) by 331 days.

This patent is subject to a terminal disclaimer.

(21) Appl. No.: 13/798,906

(22) Filed: Mar. 13, 2013

(65) Prior Publication Data

US 2013/0191727 A1    Jul. 25, 2013

Related U.S. Application Data

(63) Continuation of application No. 11/671,367, filed on Feb. 5, 2007, now Pat. No. 8,416,433.

(30) Foreign Application Priority Data

Feb. 6, 2006    (JP) ................................ 2006-028021

(51) Int. Cl.
   *G06F 17/21* (2006.01)
   *G06F 3/12* (2006.01)
   *G06F 17/22* (2006.01)

(52) U.S. Cl.
   CPC ............ *G06F 17/218* (2013.01); *G06F 3/1206* (2013.01); *G06F 3/1246* (2013.01); *G06F 3/1285* (2013.01); *G06F 17/227* (2013.01); *G06F 17/2247* (2013.01); *G06F 17/2258* (2013.01)

(58) Field of Classification Search
   None
   See application file for complete search history.

(56) References Cited

U.S. PATENT DOCUMENTS

| | | |
|---|---|---|
| 5,375,204 A | 12/1994 | Motoyama et al. |
| 6,540,142 B1 | 4/2003 | Alleshouse |
| 7,065,564 B2 | 6/2006 | Machida |
| 7,689,725 B2 | 3/2010 | Nakamura |
| 2001/0013063 A1 | 8/2001 | Hall et al. |
| 2002/0083131 A1 | 6/2002 | Machida |
| 2002/0171857 A1 | 11/2002 | Hisatomi et al. |
| 2004/0179103 A1 | 9/2004 | Endo et al. |
| 2004/0179105 A1 | 9/2004 | Endo et al. |
| 2004/0179221 A1 | 9/2004 | Endo et al. |
| 2004/0184078 A1 | 9/2004 | Endo et al. |

(Continued)

FOREIGN PATENT DOCUMENTS

| | | |
|---|---|---|
| EP | 1 586 989 | 10/2005 |
| JP | 6-236250 A | 8/1994 |

(Continued)

*Primary Examiner* — Benny Q Tieu
*Assistant Examiner* — Haris Sabah

(57) ABSTRACT

A method for driving a device that enables using a device without using a conventional device driver that is dependent on the operating system of the computer. The method has a binary data conversion step which receives a mark-up language document written in a mark-up language and converts the mark-up language document to binary data composed of commands and data that can be processed by the device. The method also includes a binary data output step in which the converted binary data is output to the device.

18 Claims, 10 Drawing Sheets

(56) References Cited

U.S. PATENT DOCUMENTS

| | | |
|---|---|---|
| 2004/0208164 A1 | 10/2004 | Keenan et al. |
| 2005/0024671 A1 | 2/2005 | Abe |
| 2005/0099647 A1 | 5/2005 | Aichi |
| 2005/0278616 A1 | 12/2005 | Eller |
| 2006/0184510 A1 | 8/2006 | Nishio |
| 2006/0206605 A1 | 9/2006 | Machida |
| 2006/0221368 A1 | 10/2006 | Higuchi |
| 2007/0073772 A1* | 3/2007 | Blue et al. .................. 707/104.1 |
| 2010/0153586 A1 | 6/2010 | Nakamura |

FOREIGN PATENT DOCUMENTS

| | | |
|---|---|---|
| JP | 2002-229752 A | 8/2002 |
| JP | 2002-251347 A | 9/2002 |
| JP | 2004-318818 A | 11/2004 |
| JP | 2005-115926 A | 4/2005 |
| WO | 01/06345 A1 | 1/2001 |

* cited by examiner

D1

SELECT PRINTER MODEL

POS-XXXXX ▼

SHOW DETAILS

DOWNLOAD
MODEL-DEPENDENT DATA

PORT SETTINGS

| PORT NAME | COM1 ▼ |
| TYPE | Serial ▼ |
| SPEED | 4800 ▼ |
| BIT LENGTH | 8 ▼ |
| STOP BIT | 1 ▼ |
| PARITY | NONE ▼ |

DOWNLOAD PORT SETTINGS

FIG. 3B

XML DOCUMENT A

```
⟨?XML version="1.0" encoding="Shift_JIS"?⟩
⟨torihiki⟩
  ⟨item⟩
     ⟨name⟩RADISH⟨/name⟩
     ⟨price⟩150⟨/price⟩
  ⟨/item⟩
  ⟨item⟩
     ⟨name⟩STRAWBERRY⟨/name⟩
     ⟨price⟩500⟨/price⟩
  ⟨/item⟩
  ⟨item⟩
     ⟨name⟩PEACH⟨/name⟩
     ⟨price⟩200⟨/price⟩
  ⟨/item⟩
⟨/torihiki⟩
```

FIG. 5

XML DOCUMENT B

```
<?XML version="1.0" encoding="Shift_JIS"?>
<print>
<underline> RADISH </underline>
<normal> 150 </normal>
<underline> STRAWBERRY </underline>
<normal> 500 </normal>
<underline> PEACH </underline>
<normal> 200 </normal>
</print>
```

FIG. 6

SAMPLE OUTPUT

<u>RADISH</u> 150  <u>STRAWBERRY</u> 500  <u>PEACH</u> 200

FIG. 7

OUTPUT STYLESHEET                                    100

```
〈?XML  version="1.0" encoding="Shift_JIS"?〉
〈XSL :stylesheet version="1.0"
        xmlns :xsl="http ://www.w3.org/1999/xsl/transform" 〉
〈XSL :output method="xml" encoding="Shift_JIS"/ 〉
〈!-- DOCUMENT -- 〉
〈xsl :template match="/"〉
〈print 〉
    〈xsl :apply-templates select="torihiki"/ 〉
〈/print 〉
〈/xsl :template 〉
〈!-- TRANSACTION DATA -- 〉
〈xsl :template match="torihiki" 〉
    〈xsl :apply-templates select="item"/ 〉
〈/xsl :template 〉
〈!-- PRODUCTS -- 〉
〈xsl :template match="item" 〉
    〈xsl :apply-templates select="name"/ 〉
    〈xsl :apply-templates select="price"/ 〉
〈/xsl :template 〉
〈!-- PRODUCT NAME -- 〉
〈xsl :template match="name" 〉
〈underline 〉
〈xsl :value-of select="."/ 〉
〈/underline 〉
〈/xsl :template 〉
〈!-- PRICE -- 〉
〈xsl :template match="price"〉
〈normal 〉
〈xsl :value-of select="."/ 〉
〈/normal 〉
〈/xsl :template 〉
〈/xsl :stylesheet 〉
```

FIG. 8

MODEL-DEPENDENT DATA

```
〈?xml version="1.0" encoding="Shift_JIS" ?〉
〈xsl :stylesheet version="1.0"
      xmlns :xsl="http ://www.w3.org/1999/XSL/Transform" 〉
〈xsl :output method="xml" encording="Shift_JIS"/ 〉
〈xsl :template match="/" 〉
〈print〉
〈xsl :apply-templates select="print"/ 〉
〈/print〉
〈/xsl :template〉
〈xsl :template match="normal" 〉
〈xsl :value-of select="."/ 〉
〈/xsl :template 〉
〈xsl :template match="underline"〉
〈underline set=" true" type="TM-T88" / 〉
〈xsl :value-of select="."/ 〉
〈underline set="false" type=" TM-T88" / 〉
〈/xsl :template 〉

· · · · (an ellipsis is OK) · · · ·

〈/xsl :stylesheet 〉
```

FIG. 9

PORT SETTINGS 102

```
serialport.printer=COM1
serialport.baudrate=4800
serialport.databits=8
serialport.stopbits=1
serialport.parity=NONE
```

FIG. 10

TAG SPECIFICATION

⟨ printer name="NAME OF PRINTER"
  source="WHERE THE ERROR OCCURRED"
  description="DESCRIPTION OF THE ERROR"/ ⟩

| ATTRIBUTE | DESCRIPTION |
|---|---|
| name | NAME OF PRINTER |
| source | WHERE THE ERROR OCCURRED |
| description | DESCRIPTION OF THE ERROR |

METHOD, COMPUTER, AND SYSTEM FOR AN OPERATING SYSTEM INDEPENDENT DEVICE DRIVER

CONTINUING APPLICATION DATA

This application is a continuation of, and claims priority under 35 U.S.C. §120 on, U.S. application Ser. No. 11/671,367, filed on Feb. 5, 2007. This application also claims priority under 35 U.S.C. §119 on Japanese patent application no. 2006-028021 filed on Feb. 6, 2006. The content of each such related application is incorporated by reference herein in its entirety.

BACKGROUND OF THE INVENTION

1. Field of the Invention

The present invention relates to a device driver processing method, a computer, and a processing system.

2. Description of the Related Art

Printers, scanners, and other types of devices are commonly used with a computer. Device drivers for controlling each type of device must be installed to use each device. The device driver is generally installed on the computer to which the device is connected. See, for example, Japanese Unexamined Patent Appl. Pub. JP-A-2002-251347.

Such device drivers are typically specific to the operating system of the computer on which the device driver is installed. The user must install the device driver that matches the computer operating system. However, in addition to being difficult and confusing for users that are not familiar with computers, installing software also requires knowing the type and version of the operating system in order to ensure that the matching device driver is installed. This can be a burden for the user. Replacing one computer with another computer also requires reinstalling the device driver on the new computer, which requires repeating the same troublesome installation process. The device manufacturer must also provide multiple versions of the same device driver in order to enable using their products on different computer systems.

SUMMARY OF THE INVENTION

The present invention provides a system and method that enables using a device without using a device driver that is specific to the operating system of the computer.

A first aspect of the invention is a device driver processing method that is executed by a computer. The computer has a mark-up language parsing unit for interpreting a mark-up language document written in a mark-up language. The computer has a port control unit for controlling a communication port used for communicating with a device. The mark-up language parsing unit executes a binary data conversion step for converting the mark-up language document to binary data including process commands and data that can be processed by the device. The port control unit executes a binary data output step for outputting the converted binary data to the device.

A computer according to another aspect of the invention has a mark-up language parsing unit for interpreting a mark-up language document written in a mark-up language; and a port control unit for controlling a communication port used for communicating with a device. The mark-up language parsing unit has a conversion unit for converting a mark-up language document to binary data including process commands and data that can be processed by the device. The port control unit has an output unit for outputting the converted binary data to the device.

The computer receives a mark-up language document from an application. The computer converts the mark-up language document to binary data containing the process commands and data in a form that can be processed by the device, and outputs the binary data to the device. Devices can thus be used without needing to install a specific device driver, such as a printer driver, which is a specialized program conventionally required to control each device and can be difficult to install.

The mark-up language parsing unit can be an XML (eXtensible Markup Language) parser, for example, an XML parser is built into most web browser applications available today. The invention can therefore be used on any computer on which a common web browser application is installed. Even users that are not particularly familiar with computers can therefore easily install device drivers without being aware of the computer operating system.

The computer that executes the device driver processing method of the invention does not need to be directly connected to the device.

In a network system according to another aspect of the invention having a device, a computer connected to the device, and a server connected to the computer over a network. A mark-up language document produced by an application on the computer is sent to the server. The server converts the mark-up language document to binary data and returns the converted binary data to the computer. The computer outputs the binary data to the device. In this arrangement the server functions as the computer that executes the device driver processing method of the invention.

In another aspect of the invention the computer is built into the device, and the device converts the mark-up language document to binary data.

The device driver processing method of the invention can thus be rendered in various ways according to the operating environment of the device.

In this device driver processing method the computer has a storage unit for storing at least one set of information selected from a group including: output format information relating to the format of documents output to the device, model-dependent information that is specific to each device model and defines rules for converting the mark-up language document to processing commands and data that can be processed by the device, and port information relating to the communication port. The binary data conversion step includes a first conversion step for converting the input mark-up language document based on the output format information to a mark-up language document that conforms to the output format information. The binary data conversion step also includes a second conversion step for converting the converted mark-up language document to the binary data based on the model-dependent information. The binary data conversion step also includes a binary data output step that outputs the binary data to the device based on the port information.

The input mark-up language document is thus first converted to another mark-up language document that conforms to the output format information (stylesheet). The resulting mark-up language document is then converted to binary data containing the commands and data that can be processed by the device based on the model-dependent data. By converting the documents in steps errors that might occur during the conversion process can be more easily identified and resolved, thus improving data management and maintenance. In addition, the user can edit the output stylesheet as needed so that the input mark-up language document is output to the device in the format desired by the user.

Preferably, the output format information, model-dependent information, and port information are stored in separate storage units.

Data that is used for different purposes can thus be managed and used separately. More specifically, while the output format information may be edited by the user, the model-dependent information is supplied by the device manufacturer. The port information relates to the communication port to which the device is connected, and is unrelated to the output format stylesheet and model-dependent information. By thus separately managing these different types of information, the data can be updated more easily and maintained more efficiently.

In a further aspect of the invention, the port control unit further executes an event data acquisition step for getting event data that is composed of device output commands and is based on events that occurred within the device. The mark-up language parsing unit executes an event data conversion step for converting the acquired event data into a mark-up language document and outputting the mark-up language document.

By thus getting event data that is output by the device as statements describing errors and other events that occurred with the device, and converting the event data to a mark-up language document, which is a simple text file, the computer can easily know what errors occurred with the device and the operating status of the device, for example. By displaying the converted mark-up language document in a readable format, the event data can also be used for remotely managing the device.

Yet further preferably, the mark-up language document is written in XML, and the output format information and model-dependent information are written in XSL (eXtensible Stylesheet Language).

The device driver processing method of the invention can thus be implemented by using an XML document as the input data and writing the output format information (style sheet) and the model-dependent data in XSL.

Yet further preferably, the device is a printer. The invention can thus be applied to a printer, a device that typically has numerous configuration settings and requires a device driver that can be difficult to install, as the device controlled by the device driver processing method of the invention.

Another aspect of the invention is a system having the computer connected to a server over a network. The server has a model selection unit for generating model-dependent data that is information specific to each device, based on the device information sent by the computer. The server also has a port configuration unit for generating port information containing communication parameters for the communication port connecting the device to the computer. In addition, the server has a storage unit for storing model-dependent data for each device. The computer has a storage unit for storing the model-dependent data and port information sent from the server.

The computer acquires only the information specific to the device from the server based on the device information. The device information is entered using an input device disposed to the server. The user can easily generate the device-specific information on the server and send the device-specific information to the computer.

Further preferably, the computer is connected to the device, and the computer sends the device information from the device to the server. The device-specific information can thus be generated automatically and stored in the computer without user intervention.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 3A shows an example of the model selection window;
FIG. 3B shows an example of the port configuration window;
FIG. 5 shows an example of the input data;
FIG. 6 describes an example of the input data after conversion;
FIG. 7 shows an example of the printer output;
FIG. 8 shows an example of the output stylesheet;
FIG. 9 shows an example of the model-dependent data;
FIG. 10 shows an example of the port configuration data.

DESCRIPTION OF THE PREFERRED EMBODIMENTS

A preferred embodiment of a device driver processing method, a computer and a processing system according to the present invention is described below with reference to the accompanying figures. The device driver processing method of the invention enables a computer to function as a device driver by, for example, first acquiring a document written in a mark-up language that is output by an application program, converting this mark-up language document to binary data including data or control commands that can be processed by a device, and then controlling the output of the converted binary data to the device. The device driver processing method of the invention in the embodiment described below may be used on a network system including a server, a computer, and a printer.

Figure 1:
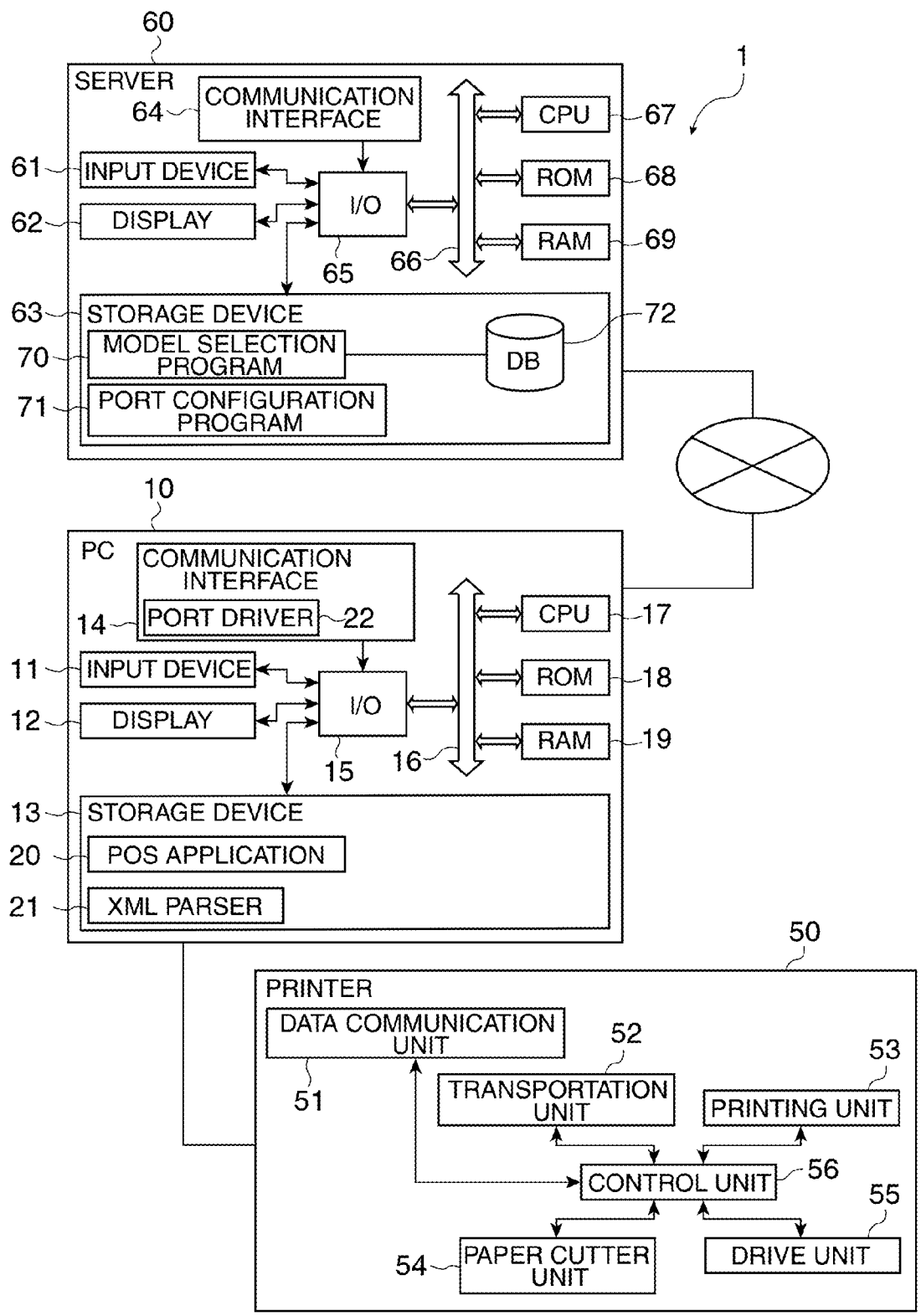
FIG. 1 is a schematic block diagram of a network system.

FIG. 1 is a schematic block diagram of the network system 1 (referred to below as simply a "system") according to an aspect of the invention. As shown in FIG. 1, this system 1 includes a computer ("PC" below) 10 on which is installed a device driver with the processing method of the invention, a printer 50 that is connected to the PC 10 as a device, and a server 60 that is connected to the PC 10 over a network such as the Internet or an intranet and supplies data to the PC 10. The PC 10 and printer 50 are connected by a communication cable.

The PC 10 may be a typical personal computer having one or more input devices 11, a display 12, a storage device 13, a communication interface 14, an input/output (I/O) interface 15, an internal bus 16, a CPU 17, ROM 18, and RAM 19. The PC 10 in an embodiment of the invention may be a POS terminal that is installed in a retail store, for example, and generates transaction data for printing sales receipts. The input devices 11 may include a mouse, a keyboard, a barcode reader, and a card reader. The PC 10 may acquire sales information from data that is input using the keyboard, the barcode reader, or the card reader, for example, and may present the product names and price information on the display 12. As shown in the figure, the communication interface 14 has a port driver 22 (port control unit) for controlling the communication port used for communication with the printer 50.

The storage device 13 may store a POS application 20 for running the transaction process and generating transaction data, and an XML parser 21, which is a general purpose program for interpreting XML documents. This XML parser 21 converts XML documents output from the POS application 20 to the commands and data that can be processed by the printer 50. More specifically, the CPU 17 executes the transaction processes by running the POS application 20, and controls the device driver process of the printer 50 by means of the XML parser 21.

The printer 50 operates as a receipt printer and includes a data communication unit 51 for data communication with the PC 10 through the communication interface 14, a transportation unit 52 for conveying receipt paper that is stored in a roll, a printing unit 53 for printing on the receipt paper synchronized to receipt paper transportation, a paper cutter unit 54 for cutting the printed portion of the receipt paper, a drive unit 55 for driving the other parts of the printer, and a control unit 56 that is connected to the other parts of the printer to control overall printer 50 operation.

The server 60 is arranged similarly to the PC 10 and may include an input device 61, a display 62, a storage device 63, a communication interface 64, an I/O interface 65, an internal bus 66, a CPU 67, ROM 68, and RAM 69. A model selection program 70 for specifying the model of printer 50 that is connected to the PC 10, and a port configuration program 71 for configuring the communication port for communication with the printer 50, are stored in the storage device 63 of the server 60. A model-dependent information database 72 for storing the model-dependent data 101 (described below with reference to FIG. 9) that is provided to the PC 10 is also stored in the storage device 63 of the server 60. The server 60 compiles and sends the model-dependent data 101 and port data 102 to the PC 10 by means of the model selection program 70 and port configuration program 71. The PC 10 thus receives and stores the model-dependent data 101 and port data 102. More specifically, the server 60 provides to the PC 10 the model-dependent data 101 for the device model specified by the model selection program 70 and the port data 102 (described further below with reference to FIG. 10) configured by the port configuration program 71.

The functional arrangement of the system 1 according to an embodiment of the invention is described next.

Figure 2:
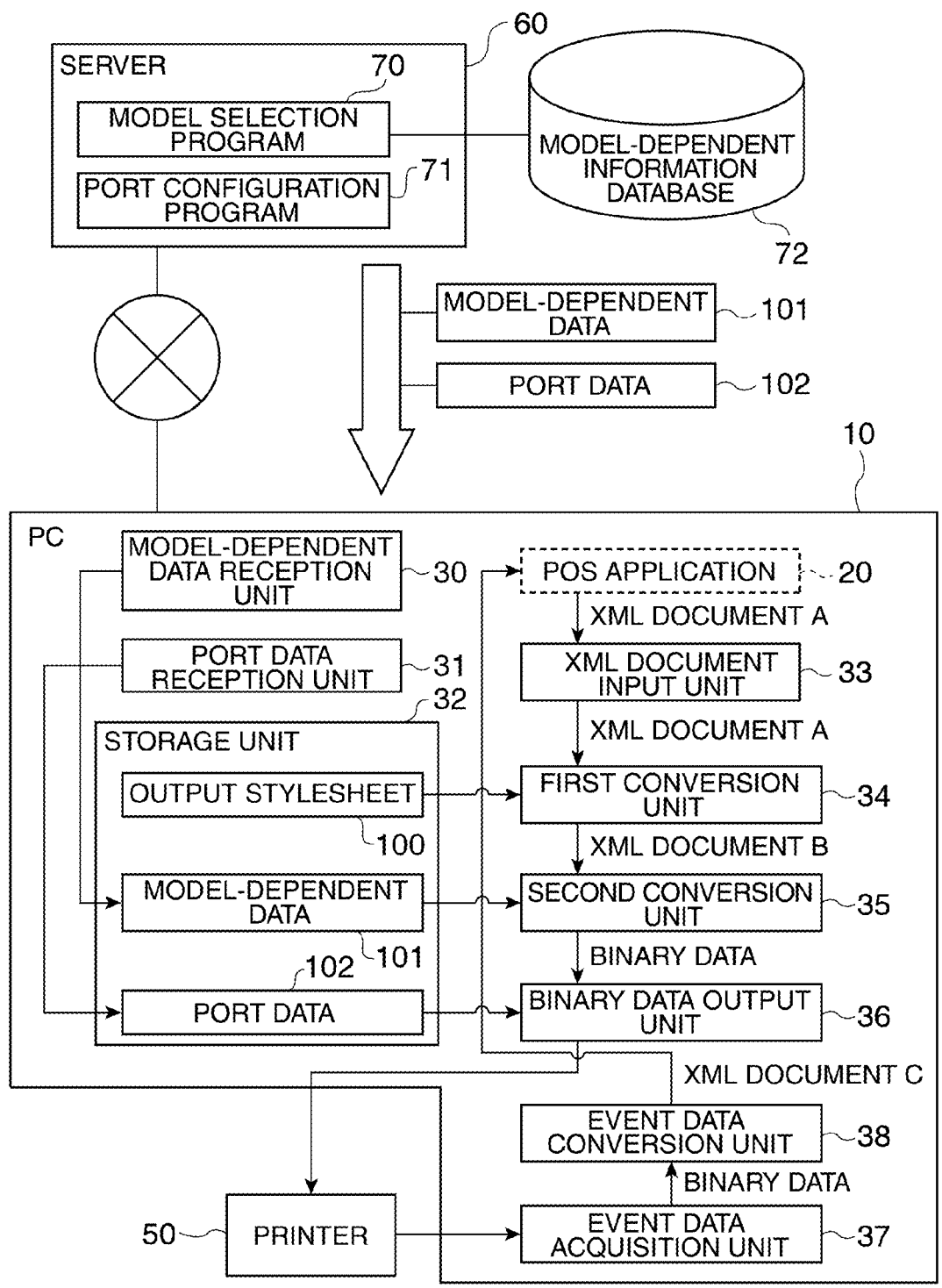
FIG. 2 is a function block diagram of the network system.

FIG. 2 is a function block diagram of the system 1. As shown in the figure, the server 60 has the model selection program 70 and the port configuration program 71 noted above, and supplies the model-dependent data 101 for the device model specified by the model selection program 70 and the port data 102 configured by the port configuration program 71 to the PC 10.

The PC 10 has a model-dependent data reception unit 30, a port data reception unit 31, a storage unit 32, an XML document input unit 33, a first conversion unit 34, a second conversion unit 35, a binary data output unit 36, an event data acquisition unit 37, and an event data conversion unit 38.

The model-dependent data reception unit 30 controls storing the model-dependent data 101 sent from the server 60 in the storage unit 32.

The port data reception unit 31 similarly controls storing the port data 102 sent from the server 60 in the storage unit 32.

The model-dependent data reception unit 30 and port data reception unit 31 are rendered by the communication interface 14 shown in FIG. 1.

The storage unit 32 is rendered by the storage device 13 shown in FIG. 1, and stores the output stylesheet 100, the model-dependent data 101, and the port data 102 in separate databases. The output stylesheet 100, the model-dependent data 101, and the port data 102 are described in further detail below.

The XML document input unit 33 outputs an XML document (XML document A in FIG. 2) received from the POS application 20 to the first conversion unit 34.

The first conversion unit 34 then converts this XML document (XML document A) based on the output stylesheet 100 in the storage unit 32 to an XML document (XML document B) that conforms to the output stylesheet 100.

The second conversion unit 35 converts the XML document (XML document B) conforming to the output stylesheet 100 to process commands or data strings that can be processed by the printer 50 based on the model-dependent data 101 in the storage unit 32, and then converts these process commands and data strings to binary data.

The binary data output unit 36 opens the communication port to the printer 50 based on the port data 102 in the storage unit 32, and outputs the converted binary data to the printer 50.

The event data acquisition unit 37 gets the event data (including data and status information that can vary according to errors and specific events such as the cover opening) output as commands from the printer 50.

The binary data output unit 36 and event data acquisition unit 37 are rendered by the port driver 22 (included in the communication interface 14) incorporated in the PC 10 as shown in FIG. 1.

The event data conversion unit 38 converts the acquired event data to an XML document (XML document C) and outputs the XML document to the POS application 20, for example. The XML document input unit 33, first conversion unit 34, second conversion unit 35, and event data conversion unit 38 are rendered by the XML parser 21 running on the PC 10 as shown in FIG. 1.

The output stylesheet 100, model-dependent data 101, and port data 102 are described in further detail below.

The output stylesheet 100 (see FIG. 8) defines the output format of XML documents output to the printer 50, and includes general configuration data such as the font and print layout. This information can be customized by the user so that the user can print XML documents in the desired printing format.

The model-dependent data 101 (see FIG. 9) defines the conversion rules for converting the XML document output from the POS application 20 to commands and data that can be processed by the printer 50, and more specifically includes initialization rules for initializing the printer 50, conversion rules for character attributes (such as the double height size, double width size, and underlining), and information about printer control commands such as paper feed and paper cutter commands, for example. This information is dependent upon the specifications and settings of the particular printer 50, and will therefore also differ according to the model of the printer 50. The model-dependent data 101 also includes information defining the conversion rules for converting the event data (binary data) acquired by the event data acquisition unit 37 to an XML document.

This embodiment of the invention uses an XML document as the input data as described above, and uses the XSL for the output stylesheet 100 and model-dependent data 101 (see FIG. 8 and FIG. 9). Settings related to the communication port used to communicate with the printer 50 are defined in the port data 102 (see FIG. 10), and include the port type and data transfer rate (an example of settings for a serial connection are shown in FIG. 10).

The processes whereby the PC 10 configures the device driver for the printer 50 are described next, starting with the process whereby the PC 10 gets the model-dependent data 101 and port data 102 from the server 60.

FIG. 3A shows an example of the model selection window D1 displayed by the server 60 for setting the model-dependent data 101. FIG. 3B shows an example of the port configuration window D2 displayed by the server 60 for setting the port data 102.

As shown in FIG. 3A, the model of printer 50 that is connected to the PC 10 is selected by the user from the model selection window D1 using a keyboard, mouse, touch screen panel, or other input device not shown. After the printer 50 is selected and the download command is asserted, the model-dependent data 101 for the selected model is generated by the model selection program 70 and then downloaded from the server 60 to the PC 10.

More specifically, the model selection program 70 of the server 60 reads the model-dependent data 101 for the model selected in the model selection window D1 from the model-dependent data database 72 and sends the model-dependent data 101 to the PC 10. The "Show Details" control shown in FIG. 3A is linked to a screen for displaying items in the model-dependent data 101, and this screen can be used by the user to confirm and edit the settings of the model-dependent data 101.

As shown in FIG. 3B, the user configures the port data 102 by setting the communication port parameters (including the type of port, the data transfer rate, bit length, and stop bit) of the printer 50 in the port configuration window D2. When the port data 102 download command is then asserted, port data 102 conforming to the parameter settings in the port configuration window D2 is generated by the port configuration program 71 and then downloaded from the server 60 to the PC 10. More specifically, the port configuration program 71 of the server 60 generates the port data 102 to reflect the settings in the port configuration window D2 and then sends the port data 102 to the PC 10.

To get the model-dependent data 101 the user manually accesses the server 60, selects the model and communication port settings, and then downloads the information to the PC 10 in this example, but the PC 10 could execute this process automatically (internally). More specifically, when the printer 50 is connected to the PC 10 or initialized, the PC 10 gets the model and port data from the printer 50 and sends the data to the server 60. The server 60 then runs the model selection program 70 and port configuration program 71 to generate and return the model-dependent data 101 and port data 102 based on the received information to the PC 10.

A process whereby the PC 10 outputs an XML document output from the POS application 20 to the printer 50 by referencing the output stylesheet 100, model-dependent data 101, and port data 102 is described next with reference to FIG. 4.

The following description assumes that the output stylesheet 100 is already stored in the PC 10 at the beginning of this process, but the output stylesheet 100 can obviously be downloaded from the server 60 in the same way as the model-dependent data 101 and port data 102.

Figure 4:
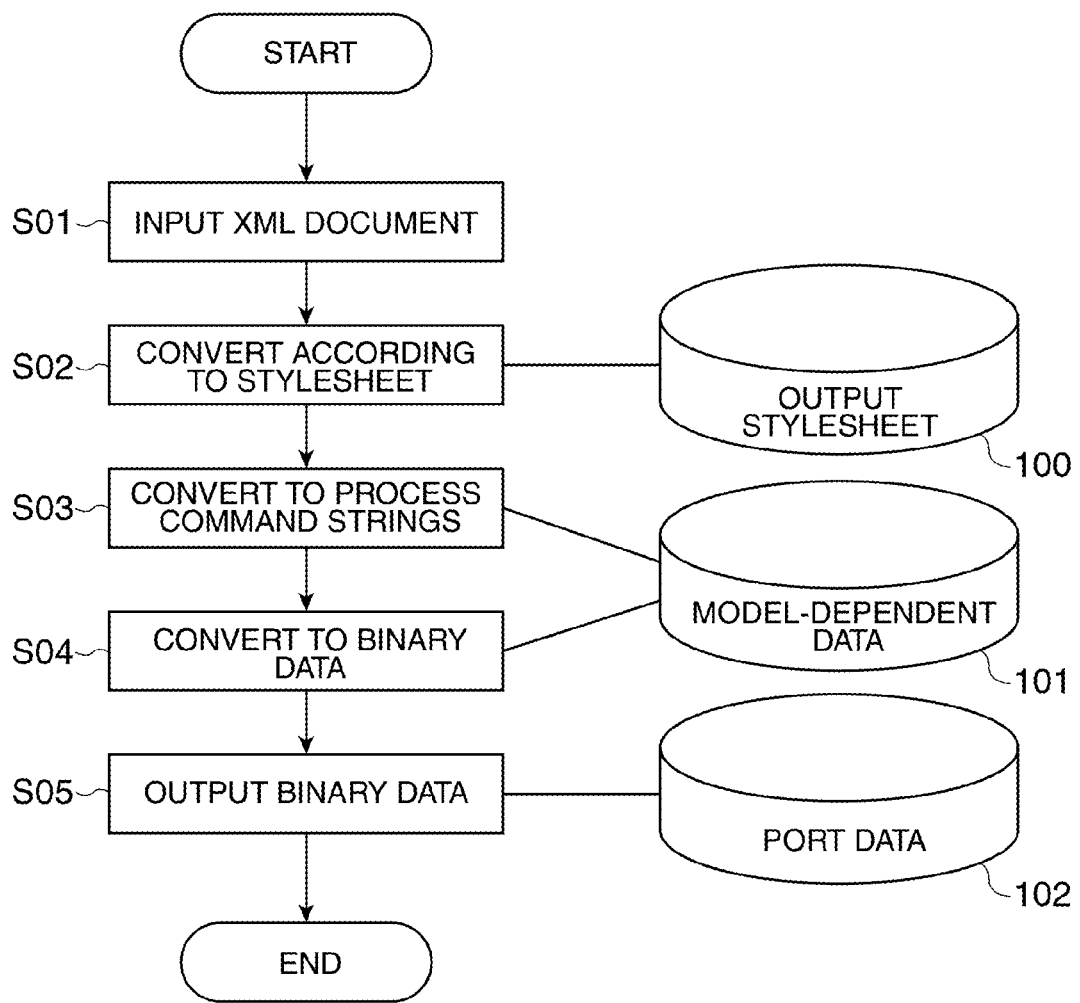
FIG. 4 is a flow chart of the process for converting an XML document to binary data.

FIG. 4 is a flow chart of the XML document conversion process that is executed by the PC 10. As shown in the figure the XML document input unit 33 inputs the XML document A output from the POS application 20 as the input data to the first conversion unit 34 (S01). The first conversion unit 34 then converts the input XML document A according to the output stylesheet 100 to an XML document B conforming to the output stylesheet 100 (S02).

The second conversion unit 35 then converts the XML document B conforming to the output stylesheet 100 to the commands and data strings that can be processed by the printer 50 based on the model-dependent data 101 (S03), and then converts these commands and data strings to binary data (S04). The binary data output unit 36 then references the port data 102 to output the converted binary data to the printer 50 (S05).

This process is further described below with reference to FIG. 5 to FIG. 10.

FIG. 5 shows an example of the XML document A used as the input data. The input data includes product name information such as "radish," "strawberries," and "peaches" and price information such as 150, 500, and 200 for each product.

FIG. 8 shows an example of the output stylesheet 100 written in XSL.

The first conversion unit 34 converts the XML document A shown in FIG. 5 based on the output stylesheet 100 shown in FIG. 8 to an XML document B conforming to the output stylesheet 100.

FIG. 6 shows the XML document B converted from the XML document A shown in FIG. 5 based on the output stylesheet 100 shown in FIG. 8.

As shown particularly by the shaded parts in FIG. 6, the name of each product is underlined in this XML document B as specified by the output stylesheet 100 shown in FIG. 8.

The second conversion unit 35 then converts the XML document B shown in FIG. 6 based on the model-dependent data 101 shown in FIG. 9 to the commands and data strings that can be processed by the printer 50, and then converts these commands and data strings to binary data.

The binary data output unit 36 then references the port data 102 shown in FIG. 10 to communicate with the printer 50 and output the converted binary data to the printer 50. An example of the output printed by the printer 50 based on this binary data is shown in FIG. 7. As shown in the figure, each product name and price is output and the product name is underlined based on the XML document A received as the input data (FIG. 5) and the output stylesheet 100 shown in FIG. 8.

The process whereby the event information (including data and status information that can vary according to errors and specific events such as the cover opening) is output as commands from the printer 50 are acquired, converted to an XML document, and output is described next. As described above, this process is executed by the event data acquisition unit 37 and event data conversion unit 38 (see FIG. 2). The event data acquisition unit 37 gets the event data (binary data) output from the printer 50, and the event data conversion unit 38 converts the event data to an XML document by referring to the model-dependent data 101 and outputs the XML document to the POS application 20.

Figures 11A, 11B:
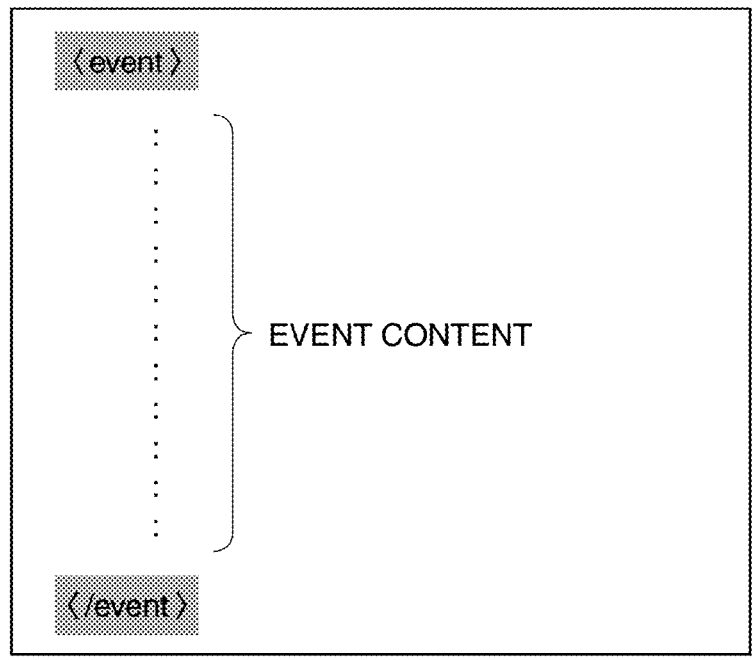
FIG. 11A and FIG. 11B describe the event data.

FIG. 11A and FIG. 11B show an example of the tag definitions used in the XML document converted from the event data. FIG. 11A shows an example in which all event data content is contained between <event> tags (shaded in the figure). As shown in FIG. 11B, the attributes describing an event include the <name> of the printer, the <source> where the event occurred, and a <description> of the event. The content of each attribute follows the attribute tag.

By outputting this XML document to the POS application 20, the POS application 20 can know the operating status of the printer 50 (has an error occurred or not) and selected status information (such as whether the cover is open or closed, and whether paper is loaded), and can manage the printer 50 remotely. Furthermore, as a result of the POS application 20 sending the XML document to the server 60, the server 60

(central processing terminal) can manage printers 50 installed in multiple stores, for example, and the printers 50 can be maintained more efficiently.

The event data acquisition unit 37 is rendered by the port driver 22 of the PC 10, and the port driver 22 functions to control and monitor the communication port for communicating with the printer 50. The event data acquisition unit 37 can therefore also be arranged to get event data for the communication port of the printer 50 (such as information reporting failure to open the port). This enables the POS application 20 to remotely manage both the printer 50 and communication between the PC 10 and printer 50, and enables centralized control by the server 60 (central processing terminal).

As described above, when a printer or other peripheral device is used, the device driver processing method of the invention enables using the device by simply installing an XML parser 21 and port driver 22 to the computer and storing an output stylesheet 100, model-dependent data 101, and port data 102.

The XML parser 21 is part of a typical web browser application, and by using a PC that has an installed web browser, the user does not need to install any special software in order to use a device. As a result, a conventional device driver that is a dedicated software program for controlling a device does not need to be installed to match the operating system of the computer. Casual computer users can therefore easily use a printer (a device) without knowing anything about the computer environment, including the type and version of the operating system. The job of replacing a computer that requires installing new device drivers can also be simplified.

The job of the manufacturer that provides the device is also made easier because it is not necessary to provide a conventional device driver such as a printer driver that is dependent on the computer operating system. More particularly, a conventional printer driver must be programmed according to operating system of the computer on which the printer driver will be installed, but the invention makes this programming unnecessary and therefore greatly reduces development costs.

Furthermore, when firmware for controlling a printer 50 is installed on the printer 50, the firmware settings and reference values can be stored in the model-dependent data 101, and the firmware can get and process the required information by referencing the model-dependent data 101. The firmware can therefore be updated by simply updating the model-dependent data 101.

Changes in the output format, the model of printer 50, and communication port settings can also be handled by simply changing the output stylesheet 100, the model-dependent data 101, and the port data 102. More specifically, the invention eliminates the need of the prior art to change the device driver program. Furthermore, if any of the information needs changing, the user can change the output format, change the printer 50 model, and change the communication port settings in real time.

Furthermore, model-dependent data 101 for a plurality of different devices can be stored on the PC 10. In this case the user can choose the types of devices to use to read the model-dependent data 101 for the selected device as needed. If multiple devices are connected to the PC 10, each of the devices can be used by simply storing the model-dependent data 101 for each device on the PC 10.

The PC 10 is described above as the computer that executes the method of the invention in a system 1 that includes a server 60, a PC 10, and a printer 50, but the computer that executes the method of the invention is not limited to the PC 10. The computer may be a computing device that comprises a processing unit and a communication port. The server 60 could be the computer that executes the method of the invention. In this case the XML parser 21 and port driver 22 are installed to the server 60, the server 60 receives the XML documents from the PC 10, converts the XML documents to binary data, and outputs the binary data through the PC 10 to the printer 50.

If the POS application 20 runs on the server 60 instead of the PC 10, the converted binary data can be output directly to the printer 50 instead of through the PC 10.

If the server 60 is the computer that implements the invention, the server 60 gets model information relating to the model of each device, and reads the model-dependent data 101 for the acquired device models. The model information can be acquired by manually entering the data using an input device 61 of the server 60, or the server 60 can access each device to automatically (internally) read the device information. The port data 102 can also be set using the input device 61 of the server 60.

Furthermore, by incorporating the XML parser 21 in the printer 50 and storing the output stylesheet 100, model-dependent data 101, and port data 102 in memory in the printer 50, the printer 50 can be used as the computer that implements the invention.

In this case the XML document output from the POS application 20 is input to the printer 50, the printer 50 internally converts the received (input) XML document to binary data, and outputs the binary data to a buffer, for example.

The invention can thus be implemented using a variety of different hardware configurations, and the device driver processing method of the invention can be executed in various ways according to the operating environment of the printer 50.

A printer 50 is used by way of example as a device in this embodiment of the invention, but the invention is not limited to printers 50 and can be applied to other devices such as scanner, displays, and data readers.

The output stylesheet 100, model-dependent data 101, and port data 102 is stored for each device type (such as printer or scanner), and this data is used selectively according to the type of device to which the data is output.

Furthermore, the invention is described using an XML document by way of example as the input data, but the invention is not limited to XML documents and can use documents written in other mark-up languages, including HTML (HyperText Markup Language) and SGML (Standard Generalized Markup Language), as the input data.

Furthermore, a POS application 20 is used by way of example as the application that outputs the input data (XML document), but the type of application that can be used is not limited to any particular type.

The invention is also not limited to a system 1 as described above, and the hardware arrangement and process steps can be varied in many ways without departing from the scope of the accompanying claims.

In accordance with further aspects of the invention, any of the above-described methods or steps thereof may be embodied in a program of instructions (e.g., software) which may be stored on a computer readable medium, or conveyed to, a computer or other processor-controlled device for execution. Alternatively, any of the methods or steps thereof may be implemented using functionally equivalent hardware (e.g., application specific integrated circuit (ASIC), digital signal processing circuitry, etc.) or a combination of software and hardware.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A printer processing method executed by a computer coupled to the printer the method comprising:
providing said computer with a mark-up language parsing unit interpreting mark-up language documents written in a mark-up language, and a port control unit controlling a communication port communicating with a printer having multiple mechanisms including a cover, a paper cutter, and a transportation unit to transport a print-medium, wherein:
the mark-up language parsing unit executes a binary data conversion step for receiving a first mark-up language document and converting the first mark-up language document to binary data including a mechanism control command that can be processed by the printer and that controls to at least one of the paper cutter and the transportation unit, the mechanism control command being based on model-dependent information that is specific to the printer and that defines a rule for converting the first mark-up language document to the mechanism control command;
the port control unit executes a binary data output step for outputting the converted binary data to the printer, based on port information relating to the communication port;
the port control unit executes a status information acquisition step that receive status information related to at least one of the mechanism and outputted from the from the printer as binary data; and
the model-dependent information defines rules for converting the received, binary data, status information to a second mark-up language document;
the first mark-up language document is an XML document output from a POS application running a transaction process and generating transaction data; and
the mark-up language parsing unit further executes a status information conversion step for converting the received status information to the second mark-up language document based on the model-dependent information and outputting the second mark-up language document as an XML document to the POS application.

2. The printer processing method described in claim 1, wherein:
the binary data conversion step includes:
a first conversion step for converting the first mark-up language document to a converted mark-up language document that conforms to output format information relating to a document format for documents output to the printer, and
a second conversion step for converting the converted mark-up language document to the binary data, based on the model-dependent information.

3. The printer processing method described in claim 2, wherein:
the output format information is user-defined; and
the first conversion step includes converting the first mark-up language document to an output format based on the output format information.

4. The printer processing method described in claim 1, wherein the POS application manages the printer by use of the status information in the second mark-up language document output as XML document.

5. The printer processing method described in claim 4, wherein the printer prints based on the transaction process.

6. The printer processing method described in claim 1, further comprising:
accessing a server coupled to the computer and printer, and retrieving the model-dependent information and port-communications information from the server.

7. A non-transitory computer readable medium containing instructions for performing the method described in claim 1.

8. A computer for executing a printer processing method, the computer comprising:
a mark-up language parsing unit for interpreting a mark-up language document written in a mark-up language; and
a port control unit for controlling a communication port used for communication with a printer having multiple mechanisms including a cover, a paper cutter, and transportation unit to a transport a print-medium;
wherein:
the mark-up language parsing unit has a conversion unit for converting a first mark-up language document to binary data including a mechanism control command that can be processed by the printer and that controls to at least one of the paper cutter and the transportation unit, the mechanism control command being based on model-dependent information that is specific to the printer and defines a rule for converting the mark-up language document to the mechanism control command when the mark-up language document is input;
the port control unit has an output unit for outputting the converted binary data to the printer, based on port information relating to the communication port;
the port control unit further having an input unit for inputting status information related to at least one of the mechanisms and outputted from the printer as a binary data;
the model-dependent information defines rules for converting the received, binary data, status information to a second mark-up language document;
the first mark-up language document is an XML document output from a POS application running a transaction process and generating transaction data; and
the mark-up language parsing unit further executes a status information conversion step for converting the received status information to the second mark-up language document based on the model-dependent information and outputting the second mark-up language document as an XML document to the POS application.

9. The printer processing method described in claim 8, wherein:
wherein the conversion unit has:
a first conversion unit for converting the first mark-up language document to a converted mark-up language document that conforms to output format information relating to a document format for documents output to the printer, and
a second conversion unit for converting the converted mark-up language document to the binary data based on the model-dependent information.

10. The computer described in claim 9, wherein:
the output format information is user-defined: and
the first conversion unit converts the first mark-up language document to an output format based on the output format information.

11. The computer described in claim 8, wherein the POS application manages the printer by use of the status and selected status in the second mark-up language document output as the XML document.

12. The computer described in claim 11, wherein the printer prints based on the transaction process.

13. The computer described in claim 8, further comprising:
a storage unit storing the model-dependent information and the port information;
a model-dependent data reception unit for accessing a server coupled to the computer and printer, and retrieving from the server the model-dependent information and port-communications information; and
a port data reception unit for controlling the storing of the port information sent from the server into the storage unit.

14. A system, comprising:
the computer described in claim 8; and
a server, the server and the computer communicating over a network, the server comprising:
a model selection unit for generating model-dependent data for a model of the printer based on printer information sent by the computer, the model-dependent data together representing the model-dependent information;
a port configuration unit for generating port information containing communication parameters for the communication port connecting the printer to the computer; and
a storage unit for storing model-dependent data for the printer;
wherein the server sends the model-dependent information and port information to said computer.

15. The system described in claim 14, further comprising an input device, in communication with the server, for entering the printer information.

16. The system described in claim 14, wherein the computer is connected to the printer, and the computer gets and sends the printer information from the printer to the server.

17. A device processing method executed by a computer, the method comprising:
providing said computer with a mark-up language parsing unit interpreting a mark-up language document written in a mark-up language, and a port control unit controlling a communication port communicating with a device wherein;
the mark-up language parsing unit executes a binary data conversion step for receiving the mark-up language document and converting the mark-up language document to binary data including process commands and data that can be processed by the device, based on model-dependent information that is specific to each device and defines rules for converting the mark-up language document to the processing commands and data; and
the port control unit executes a binary data output step for outputting the converted binary data to the device, based on port information relating to the communication port;
wherein:
the model-dependent information further defines rules for converting an event data is output as commands from the device to the mark-up language document;
the port control unit further executes an event data acquisition step for getting the event data that is output based on events that occurred with the device as a binary data; and
the mark-up language parsing unit further executes an event data conversion step for converting the acquired event data to the mark-up language document based on the model-dependent information and outputting the mark-up language document as an XML document to the POS application.

18. A computer for executing a device processing method, the computer comprising:
a mark-up language parsing unit for interpreting a mark-up language document written in a mark-up language; and
a port control unit for controlling a communication port used for communication with the device;
wherein the mark-up language parsing unit has a conversion unit for converting a mark-up language document to binary data including process commands and data that can be processed by the device, based on model-dependent information that is specific to each device and defines rules for converting the mark-up language document to the processing commands and data when the mark-up language document is input; and
the port control unit has an output unit for outputting the converted binary data to the device, based on port information relating to the communication port;
wherein:
the mark-up language document is an XML document output from a POS application for running the transaction process and generating transaction data;
wherein the conversion unit has:
a first conversion unit for converting the mark-up language document to a converted mark-up language document that conforms to the output format information, based on output format information relating to the format of documents output to the device, and
a second conversion unit for converting the converted mark-up language document to the binary data based on the model-dependent information; and
wherein:
the model-dependent information further defines rules for converting an event data is output as commands from the device to the mark-up language document;
the port control unit has an event data acquisition unit for getting the event data that is output based on events that occurred with the device as a binary data; and
the mark-up language parsing unit has an event data conversion unit for converting the acquired event data to the mark-up language document based on the model-dependent information and outputting the mark-up language document as an XML document to the POS application.

* * * * *